(12) United States Patent
Hill

(10) Patent No.: US 7,263,259 B2
(45) Date of Patent: Aug. 28, 2007

(54) MULTIPLE-SOURCE ARRAYS FED BY GUIDED-WAVE STRUCTURES AND RESONANT GUIDED-WAVE STRUCTURE CAVITIES

(75) Inventor: Henry Allen Hill, Tucson, AZ (US)

(73) Assignee: Zetetic Institute, Tucson, AZ (US)

( * ) Notice: Subject to any disclaimer, the term of this patent is extended or adjusted under 35 U.S.C. 154(b) by 0 days.

(21) Appl. No.: 10/774,250

(22) Filed: Feb. 6, 2004

(65) Prior Publication Data
US 2004/0202426 A1    Oct. 14, 2004

Related U.S. Application Data

(60) Provisional application No. 60/445,739, filed on Feb. 7, 2003.

(51) Int. Cl.
*G02B 6/26* (2006.01)
*G02B 6/34* (2006.01)
*G02B 6/10* (2006.01)

(52) U.S. Cl. ............... 385/39; 385/129; 385/31; 385/36

(58) Field of Classification Search ............... 385/28, 385/37, 129–133, 902; 356/477, 482, 901, 356/902
See application file for complete search history.

(56) References Cited

U.S. PATENT DOCUMENTS

| | | | |
|---|---|---|---|
| 5,220,403 A | 6/1993 | Batchelder | |
| 5,485,317 A | 1/1996 | Perissinotto | |
| 5,602,643 A | 2/1997 | Barrett | |
| 5,614,763 A | 3/1997 | Womack | |
| 5,633,972 A * | 5/1997 | Walt et al. ............... | 385/116 |
| 5,699,201 A | 12/1997 | Lee | |
| 5,760,901 A | 6/1998 | Hill | |
| 5,864,642 A * | 1/1999 | Chun et al. ............... | 385/14 |
| 5,894,195 A | 4/1999 | McDermott | |
| 5,915,048 A | 6/1999 | Hill et al. | |
| 6,091,496 A | 7/2000 | Hill | |
| 6,330,065 B1 | 12/2001 | Hill | |
| 6,445,453 B1 | 9/2002 | Hill | |
| 6,480,285 B1 | 11/2002 | Hill | |
| 6,552,805 B2 * | 4/2003 | Hill ............... | 356/511 |
| 6,552,852 B2 | 4/2003 | Hill | |
| 6,597,721 B1 * | 7/2003 | Hutchinson et al. ...... | 372/98 |
| 6,606,159 B1 | 8/2003 | Hill | |
| 6,667,809 B2 | 12/2003 | Hill | |
| 6,714,349 B2 | 3/2004 | Nam | |
| 6,717,736 B1 | 4/2004 | Hill | |
| 6,738,551 B2 * | 5/2004 | Noda et al. ............ | 385/130 |

(Continued)

OTHER PUBLICATIONS

U.S. Appl. No. 60/442,982, filed Jan. 29, 2003, Hill.

(Continued)

*Primary Examiner*—Rodney Bovernick
*Assistant Examiner*—Omar Rojas
(74) *Attorney, Agent, or Firm*—Wilmer Cutler Pickering Hale and Dorr LLP

(57) ABSTRACT

A multiple source array including a guided-wave structure having a dielectric core and a cladding covering the dielectric core; and an array of dielectric-filled, guided-wave cavities in the cladding extending transversely from the dielectric core and forming an array of apertures through which optical energy that is introduced into the core exits from the core.

36 Claims, 7 Drawing Sheets

U.S. PATENT DOCUMENTS

| | | |
|---|---|---|
| 6,753,968 B2 | 6/2004 | Hill |
| 6,775,009 B2 | 8/2004 | Hill |
| 6,847,029 B2 | 1/2005 | Hill |
| 2002/0074493 A1 | 6/2002 | Hill |
| 2003/0174992 A1* | 9/2003 | Levene et al. ............... 385/129 |
| 2004/0013384 A1* | 1/2004 | Parker et al. ............... 385/129 |
| 2004/0201852 A1 | 10/2004 | Hill |
| 2004/0201853 A1 | 10/2004 | Hill |
| 2004/0201854 A1 | 10/2004 | Hill |
| 2004/0201855 A1 | 10/2004 | Hill |
| 2004/0202426 A1 | 10/2004 | Hill |
| 2004/0227950 A1 | 11/2004 | Hill |
| 2004/0227951 A1 | 11/2004 | Hill |
| 2004/0228008 A1 | 11/2004 | Hill |
| 2004/0246486 A1 | 12/2004 | Hill |
| 2004/0257577 A1 | 12/2004 | Hill |

OTHER PUBLICATIONS

U.S. Appl. No. 60/444,707, filed Jan. 4, 2003, Hill.

Ulrich, R., "Optimum Excitation of Optical Surface Waves", *JOSA* 61, pp. 1467-1477 (1971).

Sarid, D., "High Efficiency Input Output Prism Waveguide Coupler: An Analysis", *Applied Optics* 18, pp. 2921-2926 (1979).

Urquhart, P., "Transversely Coupled Fiber Fabry-Perot Resonator: Theory" *Applied Optics* 26, pp. 456-463 (1987).

Brierley, et al., "Transversely Coupled Fiber Fabry-Perot Resonator: Performance Characteristics", *Applied Optics* 26, pp. 4841-4845 (1987).

* cited by examiner

MULTIPLE-SOURCE ARRAYS FED BY GUIDED-WAVE STRUCTURES AND RESONANT GUIDED-WAVE STRUCTURE CAVITIES

RELATED APPLICATIONS

This application is related to commonly owned U.S. patent application Ser. No. 09/917,400 (ZI-18) entitled "Multiple-Source Arrays with Optical Transmission Enhanced by Resonant Cavities" by Henry A. Hill; and U.S. patent application Ser. No. 09/917,402 (ZI-15) entitled "Multiple-Source Arrays for Confocal and Near-field Microscopy" by Henry A. Hill and Kyle Ferrio, both of which are incorporated herein by reference in their entirety.

This application claims the benefit of U.S. Provisional Application No. 60/445,739, filed Feb. 7, 2003.

TECHNICAL FIELD

This invention relates to light or beam sources for optical instruments, such as interferometric microscopes.

BACKGROUND OF THE INVENTION

Efficient, controlled coupling to and conveyance of optical energy through apertures is an important aspect of many optical measurement instruments. This observation is especially applicable to confocal and interferometric confocal microscopy where a high through-put, i.e., high data rates, is required while maintaining high lateral and longitudinal spatial resolutions and high signal-to-noise ratios. This observation is even more applicable to near-field microscopy which employs apertures smaller than a free space optical wavelength of an optical beam, herein after referred to as sub-wavelength apertures, to achieve imaging with high lateral spatial resolution. The low optical efficiency, typically of the order $10^{-4}$ or lower, of sub-wavelength probes used as near-field scanning probes can have a particularly negative impact on signal-to-noise ratios and measurement bandwidth.

SUMMARY OF THE INVENTION

A multiple-source array including a thin-slab guided-wave structure and an array of apertures or pinholes in a surface of the thin-slab guided wave structure is used to enhance coupling of an optical beam to beams transmitted by the array of apertures. The apertures are defined by guided-wave fibers. The enhancement is achieved as a result of several orders of magnitude increase of the intensity of a beam confined to guided-wave modes of the thin-slab guided-wave structure wherein the thickness of the thin-slab guided-wave structure is of an order of magnitude larger than the wavelength of the optical beam, e.g., 5 microns for optical beam wavelengths in the visible. The usable wavelength range for which the enhancement may be achieved is determined in part by the internal extinction of the guided-wave modes in the slab and/or fiber media and the wavelength range can include for example wavelengths in the IR, visible, UV, and VUV. The coupling efficiency can further be enhanced by approximately an order of magnitude by converting the thin-slab guided-wave structure to a Transversely Coupled Fabry-Perot Resonator (TCFPR).

In general, in one aspect, the invention features a multiple source array including a guided-wave structure having a dielectric core and a cladding covering the dielectric core; and an array of dielectric-filled, guided-wave cavities in the cladding extending transversely from the dielectric core and forming an array of apertures through which optical energy that is introduced into the core exits from the core.

Other embodiments include one or more of the following features. The dielectric core is a planar dielectric core, the cladding includes a first dielectric cladding layer covering a first side of the dielectric core, and a second dielectric cladding layer covering a second side of the dielectric core that is opposite from the first side, and the array of dielectric-filled, guided-wave cavities extends transversely from the dielectric core into the first dielectric cladding. The guided-wave structure in response to receiving a source beam characterized by a wavelength $\lambda_0$ generates excited-wave modes and the first and second cladding layers each have a thickness such that leakage through the first and second cladding layers represent a negligible loss to the guided-wave modes. Alternatively, the guided-wave structure in response to receiving a source beam characterized by a wavelength $\lambda_0$ generates excited-wave modes characterized by an extinction coefficient and wherein the first and second cladding layers each have a thickness such that the thickness of the respective cladding layer times the extinction coefficient is on the order of 10 or more.

Additional features and variations found in other embodiments include the following. The index of refraction of the core is greater than the index of refraction of the first and second cladding layers; and the index of refraction of the dielectric that fills the cavities is greater than the index of refraction of the first cladding layer. Also, the dielectric of the core is the same as the dielectric filling the cavities. The cavities can have various shapes including a rectangular cross-section in a pane that is parallel to the planar dielectric core. The cavities have a width that is on the order of $\lambda_0/2n_f$ wherein $n_f$ is the index of refraction of the dielectric in the cavity. Or, the cavities have a width selected so that there exist transmission modes of the guided wave cavities that couple to excited wave modes of the guided wave structure. The array of dielectric-filled cavities is a two dimensional array. The multiple source array is designed to operate at a selected wavelength $\lambda_0$ and the cavities have apertures that are sub-wavelength in size. The multiple source array also includes a source that during operation generates and delivers an optical beam to the dielectric core.

Still more features and variations found in still other embodiments include the following. The guided-wave structure during operation confines the delivered optical beam by total internal reflection and produces excited guided-wave modes. The multiple source array further includes a prism coupler located against the first side of the dielectric core for coupling an optical input beam into the dielectric core. The prism coupler includes a prism having an output facet and a dielectric layer that is sandwiched between the output facet and the dielectric core, wherein the dielectric layer has an index of refraction that is different from the index of refraction of the dielectric prism. The prism has an index of refraction $(n_p)$ and the dielectric layer has an index of refraction $(n_s)$ and wherein $n_s<n_p$. The dielectric layer is of uniform thickness and the output facet of the prism is parallel to the first side of the dielectric core. Alternatively, the dielectric layer is tapered and the output facet of the prism is in a non-parallel relationship with the first side of the dielectric core. The multiple source also includes a first mirror element defining a mirrored first surface through which the optical input beam passes on its way to the prism and a second mirror element defining a second mirror surface which with the first mirror surface forms a Transversely Coupled Fabry-Perot Resonator (TCFPR) having a cavity that includes the prism. It also includes an element for modulating resonant properties of the TCFPR, wherein the element for modulating resonant properties of the TCFPR is selected from the group consisting of an electro-mechanical transducer, an electro-optical phase modulator, and a device that operates by using thermal expansion.

Additionally, the dielectric core is made of a material that transmits in the UV. And the multiple source array includes a compensating layer of low index of refraction dielectric positioned so that light emanating from the array of cavities passes through the compensating layer. The cavities of the array of cavities terminate at the compensating layer. The dielectric core is made of a material selected from the group consisting of lithium fluoride, calcium fluoride, fused silica, magnesium aluminum spinel, aluminum oxynitride spinel, YAG, tantalum pentaoxide, and cubic carbon In general, in another aspect, the invention features a multiple source array including a guided-wave structure including a planar dielectric core, a first dielectric cladding layer covering a first side of the dielectric core, and a second dielectric cladding layer covering a second side of the dielectric core that is opposite from the first side; and an array of dielectric-filled, guided-wave cavities in the first dielectric cladding extending transversely from the dielectric core into the first dielectric cladding and forming an array of apertures through which optical energy that is introduced into the core exits from the core.

In general, in still another aspect, the invention features a system including an optical measurement instrument; and a multiple source array which during operation provides an array of optical beams as input to the optical instrument. The multiple source array is of the type described above. The optical instrument may be one of the following, among others: a microscope; a confocal microscope; an interferometric microscope; an interferometric confocal microscope; an interferometric far-field confocal microscope; or an interferometric near-field confocal microscope.

An advantage of at least one embodiment of the present invention is the confinement of an optical beam by total internal reflection.

Another advantage of at least one embodiment of the present invention is the use of thin-slab guided-wave structures to enhance coupling efficiency of optical beams to beams transmitted through apertures that are a sub-wavelength or of the order of a wavelength of an optical beam in size.

Another advantage of at least one embodiment of the present invention is that the thin-slab guided-wave structure is transparent for beams propagating in a direction generally orthogonal to the thin-slab guided-wave structure, i.e., beams incident at a surface of the thin-slab guided-wave structure at internal angles of incidence that are less than the critical angle of incidence for total internal reflection.

Another advantage is the control of the phase of an enhanced transmission of an optical beam through an array of wavelength and/or sub-wavelength apertures.

Another advantage is the control of an enhanced transmission of an optical beam through an array of wavelength and/or sub-wavelength apertures by adjustment of the resonant frequency of a TCFPR using one or more of electro-mechanical transducers, electro-optical phase modulators, and thermal expansion effects.

Another advantage is excitation of an optical mode of transmission through apertures of an array of wavelength and/or sub-wavelength apertures comprising guided-wave fibers.

Another advantage is that a wavelength of a source may be in the near VUV, UV, visible, or the IR. Furthermore, the source may comprise two or more different wavelengths.

Another advantage of at least one embodiment of the present invention is that the thin-slab guided-wave structure comprising an array of apertures can be used as a pinhole-array beam-splitter in confocal microscopy, interferometric confocal microscopy, and interferometric confocal near-field microscopy.

Another advantage is that in embodiments operating in a reflection mode near-field microscopy, each aperture couples a near-field probe beam to a substrate and couples a near-field signal beam generated by reflection/scattering by the substrate toward the detector. Thus, each aperture is both a transmitter and receiver for a corresponding near-field beam, thereby improving lateral resolution.

Another advantage is that a source of a far-field measurement beam or near-field probe beam may be a pulsed source wherein the pulsing of the source is synchronized with the scanning of a substrate.

Another advantage is that by using an array of apertures, multiple conjugated quadratures of far-field measurement beams or near-field probe beams reflected/scattered by a substrate can be measured jointly, i.e., the conjugated quadratures of the reflected/scattered beams measured substantially simultaneously, for a one-dimensional or a two-dimensional array of locations on the substrate.

Another advantage is that single-, bi-, double-, and quad-homodyne detection methods may be used to obtain jointly measured and non-jointly measured conjugated quadratures of reflected/scattered far-field measurement beams or reflected/scattered near-field probe beams.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
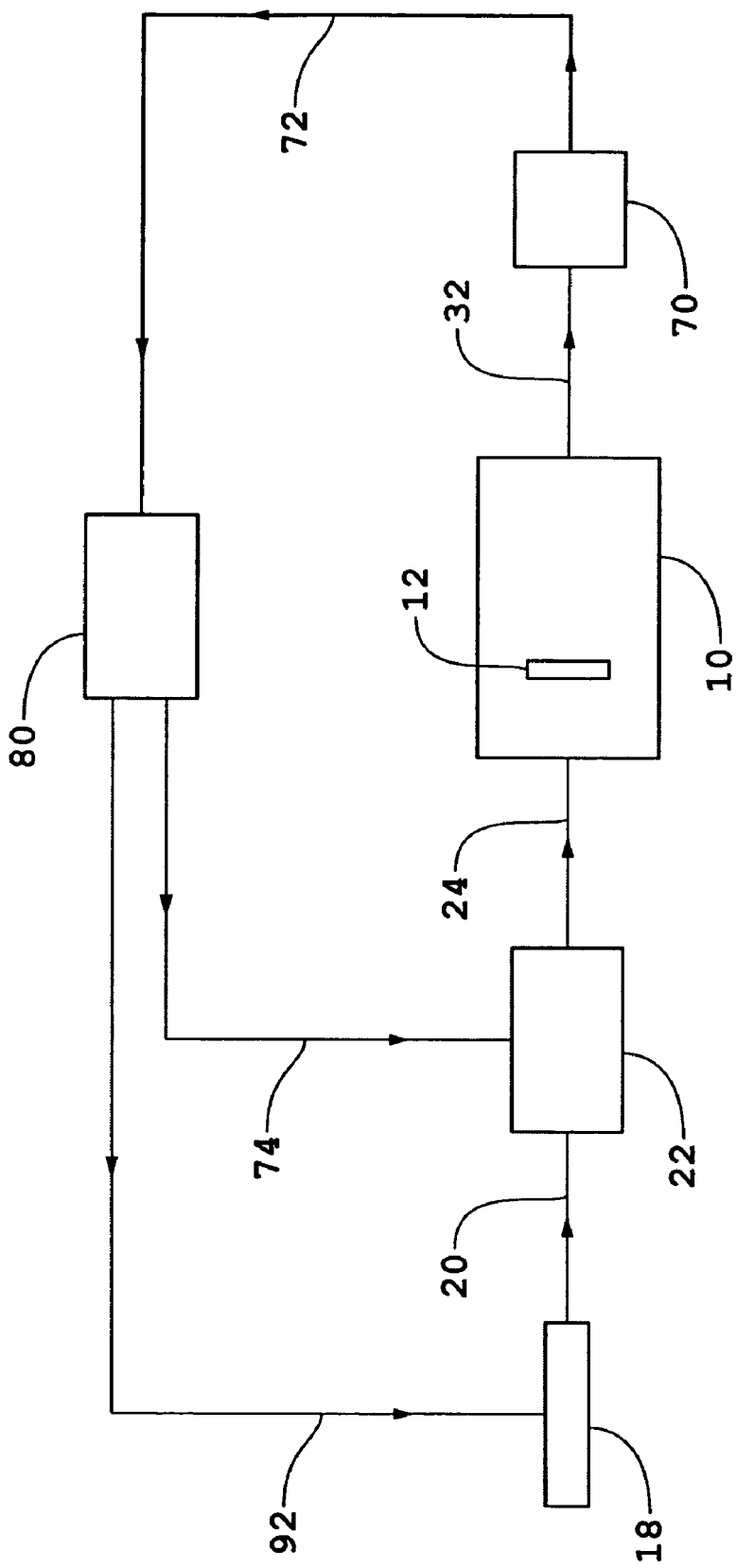
FIG. 1 is a diagram of a microscopy system that comprises a multiple source array fed by a thin-slab guided-wave structure.

The described embodiments feature systems and methods for confocal microscopy, interferometric confocal microscopy, near-field microscopy, and near-field interferometric microscopy in which a surface of a thin-slab guided-wave structure is formed that has an array of apertures to increase the coupling of a beam through the array of apertures. The increase in coupling leads to an increase in the intensity of a far-field measurement beam of a confocal microscopy system or a near-field probe beam relative to the intensity of an input beam. The array of apertures may be used in either reflective or transmissive microscopy systems, i.e., the far-field measurement beams or near-field probe beams are either reflected or transmitted, respectively, by a substrate being imaged. Furthermore, the microscopy systems using the array of apertures may be designed to investigate the profile of a surface of a substrate, a two-dimensional or a three-dimensional image of a substrate, to read optical data from a substrate, and/or write optical data to a substrate.

In the described embodiment, an optical beam is confined as excited guided-wave modes to a thin-slab guided-wave structure by total internal reflection. An input beam is coupled to modes of the thin-slab guided-wave structure either by focusing a beam to a spot at an edge of the thin-slab guided-wave structure or by a prism coupler. The diameter of an input beam may be of the order of 1 mm and the transverse dimensions of the confined beam or excited modes may be of the order of 1 mm in width by of a thickness of an order of magnitude larger than the free space wavelength of the beam, e.g., 5 microns for wavelengths in the visible, with the intensity of the excited modes being approximately 100 times larger than the intensity of the input beam.

The apertures of the array of apertures are created in the described embodiment not as pinholes or apertures in a conductor, e.g., aluminum, but by attachment of an array of guided-wave fibers to a surface of the thin-slab guided wave structure. A conductive cladding of a thin-slab guided-wave structure can generate a significant extinction coefficient for the excited modes that could significantly impact on the usable length of the thin slab guided-wave structure.

Intensity of the confined beam or amplitude of the excited modes can further be increased with a concomitant increase in coupling efficiency of excited guided-wave modes to beams transmitted by the guided-wave fibers by converting the slab guided-wave structure to a TCFPR (Transversely Coupled Fabry-Perot Resonator). The use of guided-wave fibers in lieu of pinholes in a conductor for definition of the apertures is particularly important when the thin-slab guided-wave structure is converted to TCFPR since a TCFPR operates by use of resonant cavities which generally require lower extinction coefficients.

The thin-slab guided-wave structure comprising an array of apertures can also be used as a pinhole-array beam-splitter when total internal reflection is used to guide light in the thin-slab guided-wave structure in lieu of a conducting cladding. As a consequence of the use of total internal refraction, there can be a high transmission coefficient for beams through the thin-slab guided-wave structure that have angles of incidence on the guided wave structure less than the critical angle for total internal reflection (see subsequent corresponding description given with respect to FIG. 2a). Thus, the thin-slab guided-wave structure comprising an array of apertures can be used as a pinhole-array beam-splitter such as described in commonly owned U.S. Provisional Application No. 60/442,982 (ZI-45), filed Jan. 29, 2003, entitled "Interferometric Confocal Microscopy Incorporating Pinhole Array Beam-Splitter" and corresponding U.S. patent application Ser. No. 10/765,229, filed Jan. 27, 2004 (ZI-45) and also entitled "Interferometric Confocal Microscopy Incorporating Pinhole Array Beam-Splitter" both of which are by Henry A. Hill, the contents of both U.S. applications are herein incorporated in their entirety by reference.

The thin-slab guided-wave structure may comprise an optical medium that transmits in the UV or the long wavelength end of the VUV so that the thin-slab guided-wave structure comprising an array of apertures may be effectively used in generation of an array of beams in the UV or corresponding portion of the VUV.

A microscopy system is shown diagrammatically in FIG. 1 comprising a source 18, a beam-conditioner 22, an input beam 24, a microscopy imaging system 10, a detector 70, and a signal processor and controller 80. Microscopy imaging system 10 includes a multiple-source array fed by a thin slab guided-wave structure 12 and may comprise a far-field confocal microscope, an interferometric far-field confocal microscope, a near-field microscope or an interferometric near-field confocal microscope. Microscopy imaging system 10 generates of an array of measurement and/or reference beams as required for far-field microscopy applications and near-field probe beams and/or reference beams as required for near-field microscopy applications.

Figure 2A:
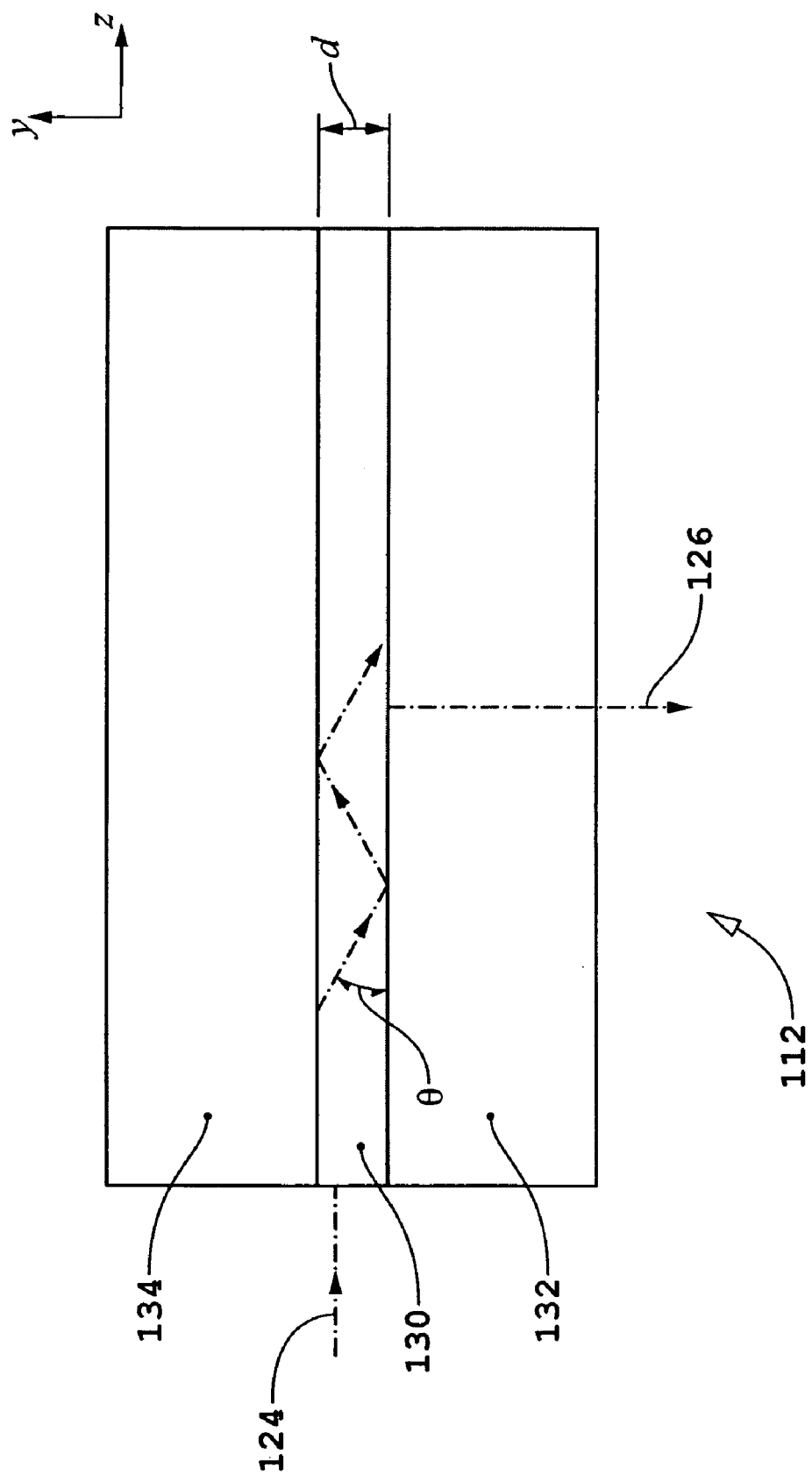
FIG. 2a is a schematic diagram of a thin-slab guided-wave structure.

A first embodiment is shown diagrammatically in FIG. 2a for the generation of an array of beams 126 from an input beam 124 with an enhanced coupling of input beam 124 to array of beams 126. The array of beams may be a one-dimensional array or two-dimensional array. Input beam 124 comprises a portion of beam 24. The first embodiment comprises a thin-slab guided-wave structure generally indicated as 112. Input beam 124 may comprise a single wavelength component or multiple wavelength components. In addition, the frequencies of the single wavelength or multiple wavelength components may be varied according to signal 74 to beam-conditioner 22 and/or signal 92 to source 18 from signal processor and controller 80.

Properties of guided-wave modes of a thin-slab guided-wave structure will first be described followed by a discussion of coupling an input beam to the thin-slab guided-wave structure and of the transmission through apertures comprising guided-wave fibers.

Thin-slab guided-wave structure 112 is of the planar dielectic waveguide type with a slab of dielectric material 130 surrounded by a dielectric cladding media 132 and 134 of lower refractive indices of refraction such as shown in FIG. 2a. The light is guided inside slab 130 by total internal reflection. The thickness of slab 130 is d in the y direction. The indices of refraction for dielectric cladding media 132 and 134 are $n_2$ and $n_3$, respectively, and the index of refraction of slab 130 is $n_1$. The dielectric cladding media is selected to have a minimum effect on the extinction coefficient for the guided waves propagating in the slab 130. The width of the excited guided-wave modes is typically two or more orders of magnitude larger than the thickness d of slab 130. Accordingly, the description of the properties of the guided-wave modes can be presented in terms of an infinite slab in width for the purposes of simplifying the description of the properties without departing from the scope and spirit of the present invention. However, the actual modes that are excited in embodiments of the present invention may comprise spatial wavenumbers in the y-direction to for example control the relative phases of beams of array of beams 126.

An important property of the described embodiments is that thin-slab guided-wave structure 112 transmits beams that are incident on slab 130 from either dielectric cladding 132 or 134. In addition, a portion of beams incident from dielectric cladding 132 on apertures associated with the array of beams 126 are radiated into slab 130 and a portion thereof is transmitted into dielectric cladding 134 for angles of incidence at interface of 130 and 134 less than the critical angle for total internal reflection. This property is important with respect to use of the thin-slab guided-wave structure having an array of apertures as a pinhole-array beam-splitter, such as described in U.S. Provisional Application No. 60/442,982 (ZI-45), filed Jan. 28, 2003 and corresponding U.S. patent application Ser. No. 10/765,229, (ZI-45), filed Jan. 27, 2004, and entitled "Interferometric Confocal Microscopy Incorporating Pinhole Array Beam-Splitter," both of which are incorporated herein by reference.

There are a number of descriptions of properties of guided-wave modes such as given by B. E. A. Saleh and M. C. Teich, *Fundamentals of Photonics*, Chapter 7, Wiley Series In Pure and Applied Optics (1991) and by J. Xu and R. Stroud, *Acousto-Optic Devices: Principles, Design, and Applications*, Chapter 4, Wiley Series In Pure and Applied Optics (1992), the contents of the two cited references are herein incorporated in their entirety by reference. In the simplifying example of a symmetrical planar guided wave structure, i.e., infinite in the x-direction, the eigenfrequencies of TE guided-wave modes are given by solutions of the transcendental equation $$\tan\left(\pi \frac{d}{\lambda} \sin\theta - m \frac{\pi}{2}\right) = \left(\frac{\sin^2 \bar{\theta}_c}{\sin^2 \theta} - 1\right)^{\frac{1}{2}} \quad (1)$$

where $\theta$ is the angle between the z axis and the direction of propagation of a beam component of the guided-wave mode bouncing back and fourth, $\bar{\theta}_c$ is the compliment of the critical angle for total internal reflection, $\lambda = \lambda_0/n_1$, $\lambda_0$ is the free space wavelength of the beam, and $m = 0, 1, 2, \ldots$. In a symmetrical planar guided-wave structure, $n_2 = n_3$. A transcendental equation also exists for the TM modes.

The solutions of Equation (1) are characterized by angles $\theta_m$ wherein the angles $\theta_m$ lie between 0 and $\bar{\theta}_c$. They correspond to eigenvectors with components $(0, n_1 k_0 \sin\theta_m, n_1 k_0 \cos\theta_m)$ where $k_0 = 2\pi/\lambda_0$. The z components are the propagation constants $$\beta_m = n_1 k_0 \cos\theta_m. \quad (2)$$

Since $\cos\theta_m$ lies between 1 and $\cos\bar{\theta}_c = n_2/n_1$, $\beta_m$ lies between $n_2 k_0$ and $n_1 k_0$.

The electric field for a TE mode is $$E_x(y,z) = a_m u_m(y) e^{-j\beta_m z} \quad (3)$$

where $a_m$ is a constant, $$u_m(y) \propto \begin{cases} \cos\left(\frac{2\pi \sin\theta_m}{\lambda} y\right), & m = 0, 2, 4, \ldots \\ \sin\left(\frac{2\pi \sin\theta_m}{\lambda} y\right), & m = 1, 3, 5 \ldots \end{cases}, \quad -\frac{d}{2} \leq y \leq \frac{d}{2}, \quad (4)$$

$$u_m(y) \propto \begin{cases} e^{-\gamma_m y}, & y > \frac{d}{2} \\ e^{\gamma_m y}, & y < -\frac{d}{2} \end{cases}, \quad (5)$$

and extinction coefficient $$\gamma_m = n_2 k_0 \left(\frac{\cos^2 \theta_m}{\cos^2 \bar{\theta}_c} - 1\right)^{\frac{1}{2}} \quad (6)$$

$$= k_0 (n_1^2 \cos^2 \theta_m - n_2^2)^{\frac{1}{2}}.$$

Similar properties exist for TM modes.

The thicknesses of dielectric claddings 132 and 143 are selected such the leakage though the claddings contribute a negligible loss to the excited guided-wave modes. To achieve this, the thickness of a cladding multiplied by the extinction coefficient given by Equation (6) is designed to be of the order of 10 or more. For the example $n_1=2.2$, $n_2=1.5$, $\theta_m=20$ degrees, and $\lambda_0=400$ nm, $\gamma_m=22.3$/micron. Thus for the example with a cladding thickness of 0.5 microns, the product of the extinction coefficient and the thickness of 0.5 microns is 11.5 and the relative amplitude of the leakage beam at the external surface of the cladding is $e^{-11.2}=1.5 \times 10^{-5}$. The intensity of the leakage beam at the external surface of the cladding is accordingly $2.2 \times 10^{-10}$.

Examples of media for slab 130 are lithium floride, calcium floride, fused silica, magnesium aluminum spinel, aluminum oxynitride (ALON) spinel, YAG, tantalum pentaoxide, and cubic carbon with indices of refraction of 1.442, 1.470, 1.737, 1.813, 1.865, 2.2, and 2.463, respectively, for a wavelength of 400 nm. These materials are singled out because they can be used to cover the wavelength range in the near VUV, the UV, the visible as well as into the IR.

Coupling of input beam 124 to modes of thin-slab guided-wave structure 112 may be achieved by directly focusing beam 124 to an end of slab 130 with an anamorphic afocal attachment. Input beam 124 may also be coupled directly from a semiconductor source (a light emitting diode or a laser diode) simply by aligning the ends of the source and the thin-slab guided wave structure while leaving a small space that is selected for maximum coupling. The end facets of slab 130 may be antireflection (AR) coated so as to improve the efficiency of coupling input beam 124 to guide-wave modes and/or to reduce the internal reflections of excited guided-wave modes. Internal reflections of excited guided-wave modes by the end facets of slab 130 will alter properties of excited guided-wave modes such as phase as a function of z which may be undesirable in certain end use applications. Other methods of coupling input beam 124 into thin-slab guided-wave structure 112 include the use of a prism or a diffraction grating.

Figure 2B:
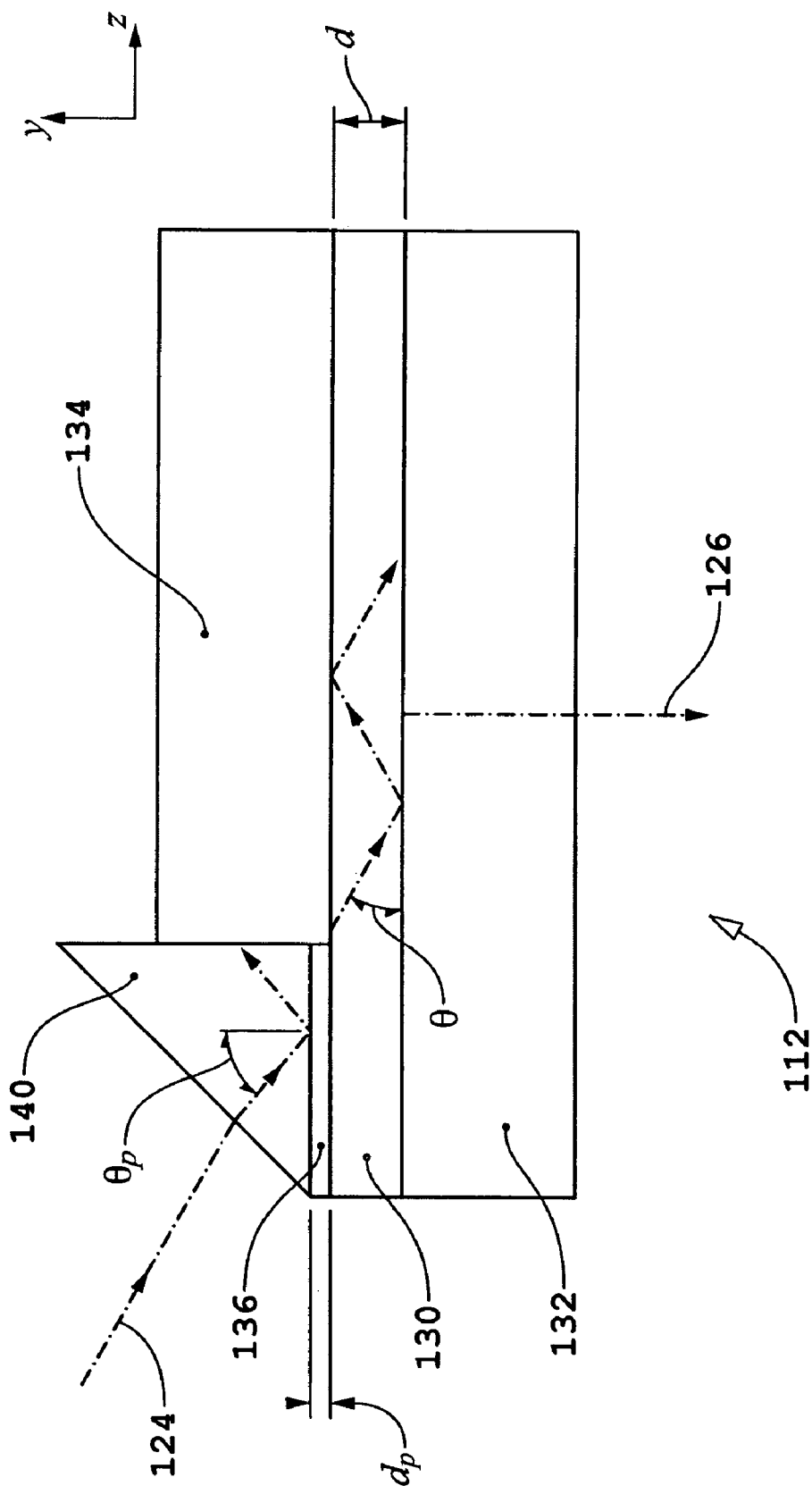
FIG. 2b is a schematic diagram of a thin-slab guided-wave structure with a prism coupler.

Coupling of input beam 124 into or out of the thin-slab guided-wave structure 112 by prism coupler 140 is illustrated in FIG. 2b. A prism of refractive index $n_p > n_4$ is placed at a distance $d_p$ from the slab 130 where $n_4$ is the refractive index of layer 136. Input beam 124 is incident into prism 140 such that it undergoes total internal reflection within prism 140 at an angle $\theta_p$. The incident and reflected waves form a wave traveling in the z direction with a propagation constant $\beta_p = n_p k_0 \cos\theta_p$. The transverse field distribution extends outside prism 140 and decays exponentially in the layer 136 separating prism 140 and slab 130. If the distance $d_p$ is sufficiently small, the wave is coupled to a mode of the thin-slab guided-wave structure with a matching propagation constant $\beta_m \approx \beta_p$. If an appropriate interaction distance is selected, power can be coupled into the thin-slab guided-wave structure 112 so that prism 140 acts as an input coupler.

The coupling efficiency can be as high as 80% for space 136 between prism 140 and slab 130 comprising a uniform thickness and higher coupling efficiencies can be achieved when spacing 136 is tapered such as described by R. Ulrich in an article entitled "Optimum Excitation of Optical Surface Waves," *JOSA* 61, pp 1467-1477 (1971) and D. Sarid in an article entitled "High Efficiency Input-Output Prism Waveguide Coupler: An Analysis," *Applied Optics* 18, pp 2921-2926 (1979), the contents of both of the two cited references are herein incorporated in their entirety by reference.

Figure 2C:
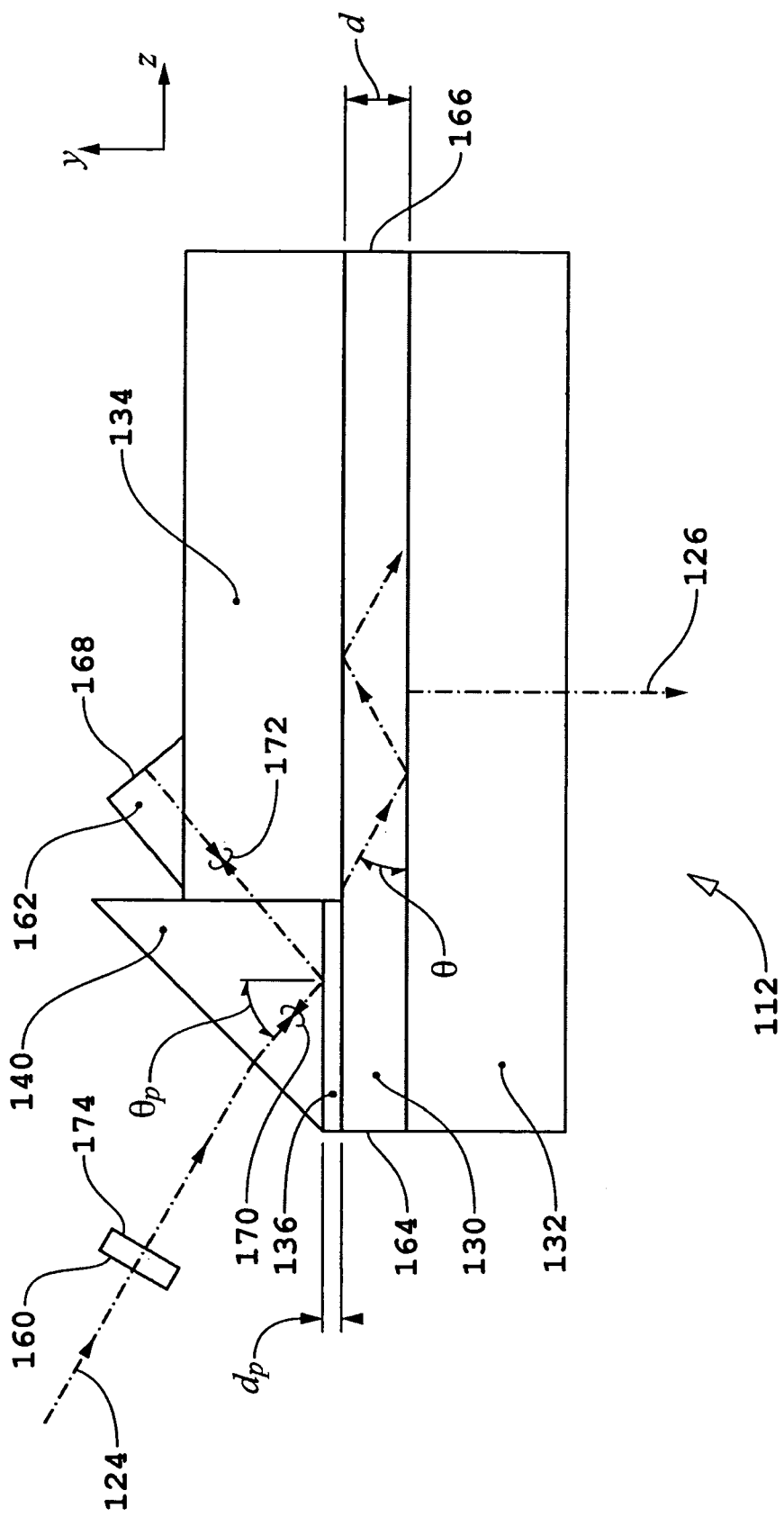
FIG. 2c is a schematic diagram of a thin-slab guided-wave structure configured as a TCFPR.

Thin-slab guided-wave structure 112 may be configured as a TCFPR as shown diagrammatically in FIG. 2c to enhance the amplitude of excited modes of thin-slab guided-wave structure relative to the intensity of input beam 124 such as described by P. Urquhart in an article entitled "Transversely Coupled Fiber Fabry-Perot Resonator: Theory," *Applied Optics* 26, pp456-463 (1987) and by M. Brierley and P. Urquhart in an article entitled "Transversely Coupled Fiber Fabry-Perot Resonator: Performance Characteristics," *Applied Optics* 26, pp 4841-4845 (1987), the contents of both of the two cited references are herein incorporated in their entirety by reference. To configure thin-slab wave guide 112 as a TCFPR, high reflective coatings are added to surfaces 164 and 166 to reflect beams of excited modes of thin-slab guided-wave structure 112 and in addition, a mirror 160 with reflecting surface 174 and a prism 162 with reflecting facet 168 are added to reflect components of beams 170 and 172, respectively, wherein mirror surface 174 and facet 168 each have high reflective coatings. Also the end facets 164 and 166 of slab 130 have high reflective coatings.

The TCFPR comprises two resonant cavities that are coupled together by slab 136 functioning as a beam-splitter. One resonant cavity or Fabry-Perot cavity is generated by reflecting surfaces 168 and 174 and beam-splitter 136. The second resonant cavity or Fabry-Perot cavity is generated by reflecting facets 164 and 166 of slab 130 and beam-splitter 136. The longitudinal modes of the two resonant cavities are controlled by the optical path lengths of the respective cavities.

Figure 2D:
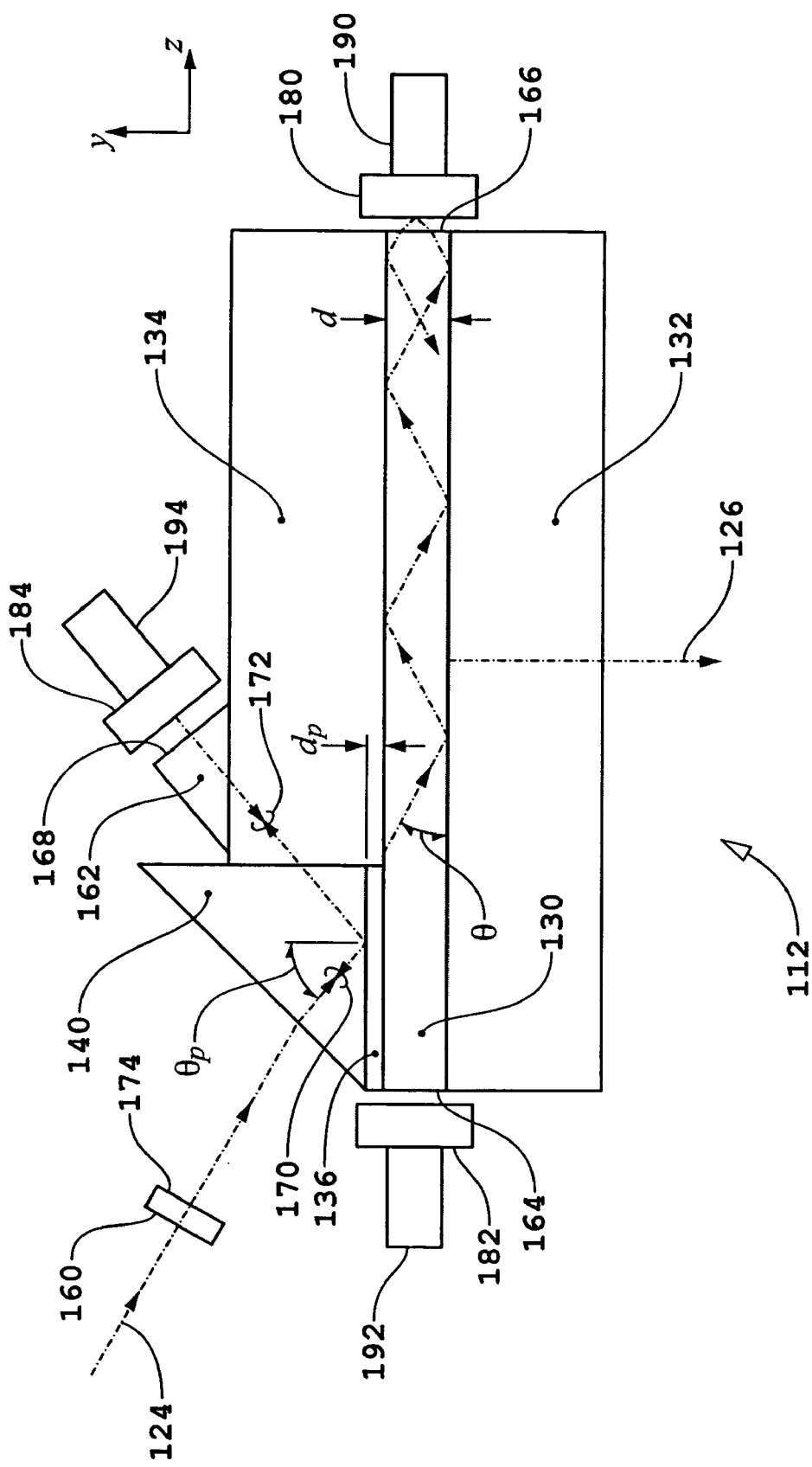
FIG. 2d is a schematic diagram of a thin-slab guided-wave structure configured as a TCFPR with adjustable cavities.

The resonant properties of the TCFPR can be controlled by using one or more of electromechanical transducers, electro-optical phase modulators, and thermal expansion affects the same techniques and procedures such as described in cited U.S. patent application Ser. No. 09/917, 400 (ZI-18). For the TCFPR shown diagrammatically in FIG. 2c, the resonant properties with respect to longitudinal modes are controlled by changing the temperature of the respective cavities so as to change the optical path lengths of the respective cavities. A TCFPR with resonant properties controlled by electromechanical transducers is shown diagrammatically in FIG. 2d. The TCFPR shown in FIG. 2d comprises the guided-wave structure shown in FIG. 2c with facets 164, 166, and 168 AR coated and with the addition of mirrors 180, 182, and 184 and corresponding transducers 190, 192, and 194. Transducer 194 controls the longitudinal position of mirror 184 which in turn controls the resonant properties of the first cavity defined by reflecting surface 174, mirror 184, and beam-splitter 136. Transducers 190 and 192 control the longitudinal positions of mirrors 180 and 182 which in turn control the resonant properties of the second cavity defined by mirrors 180, 182, and beam-splitter 136. The corresponding longitudinal modes of the first and second cavities are controlled to track each other and to maintain a prescribed phase relationship and intensity distribution of the excited modes in slab 130 with respect to the array of apertures generating the array of beams 126. The relative phases of beams of array of beams 126 can be controlled by changing the properties of the longitudinal modes, e.g., the locations of nodes and antinodes of the modes, in slab 130.

Figure 2E:
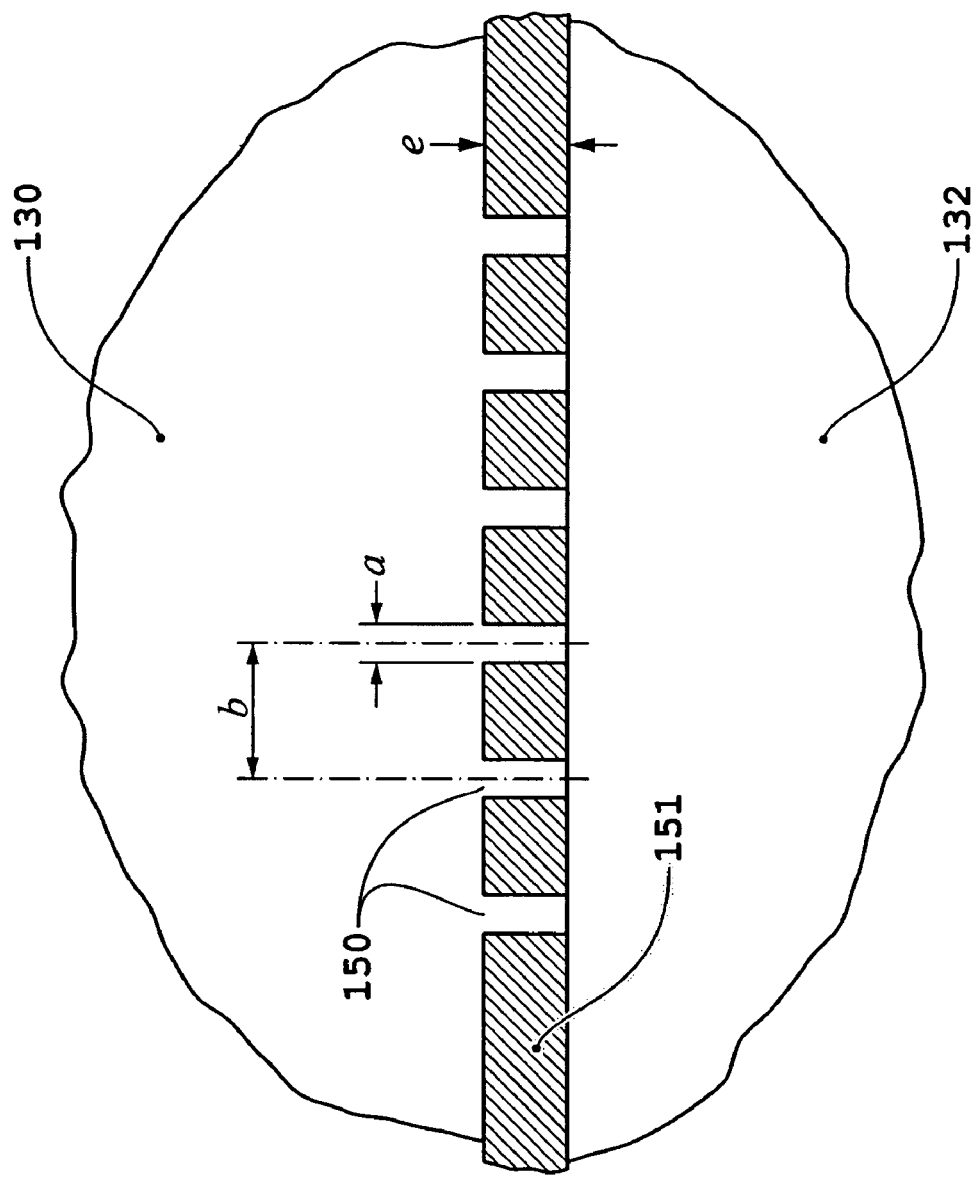
FIG. 2e is a schematic diagram of an array of apertures/guided wave fibers.

An array of apertures/guided wave fibers 150 is shown schematically in FIG. 2e with a spatial separation b, a width a, and length e. This may be either a one-dimensional array of apertures or a two-dimensional array of apertures. In either case, a typical value for e is 0.5 microns. The length e is chosen to match the thickness of the cladding 151 adjacent to slab 130 selected to obtain the desired reduced amplitude of the leakage beam at the external surface of cladding 151. For the cited example $n_1=2.2$ for slab 130, $n_2=1.5$ for cladding 151, $\theta_m=20$ degrees, and $\lambda_0=400$ nm, $\gamma_m=22.3$/micron. With a cladding thickness of 0.5 microns, the product of the extinction coefficient and the thickness of 0.5 microns is 11.5 so that the relative amplitude of the leakage beam at the external surface of cladding 151 is $e^{-11.2}=1.5\times10^{-5}$.

Apertures/guided wave fibers 150 comprise rectangular dielectric guided wave fibers wherein the width a, the orthogonal dimension of the guided wave fiber, and the refractive index of the guided wave fiber are selected so that there exist transmission modes of the guided wave fiber that couple to excited guided wave modes of thin-film guided wave structure 112. The refractive index of guided wave fibers is greater than the refractive index of cladding media 151. Cladding material 151 may be different from the refractive index of a remaining component of cladding material 132. Other shapes of the guided wave fibers may be incorporated such as described in cited U.S. patent application Ser. No. 09/917,402 (ZI-15) entitled "Multiple-Source Arrays for Confocal and Near-field Microscopy."

The spacing separation b will be determined by considerations of factors such as the pitch of pixels in detector 70, the magnification of microscopy imaging system 10, and the desired phase relationship between beams of the array of beams 126. An example of a value for b is 2.5 microns. The width a of the aperture/guided wave fibers will be larger than or of the order of $\lambda_0/2n_f$ where $n_f$ is the index of refraction of guided wave fiber 150. For a $\lambda_0=400$ and $n_f=2.2$, $a\geq 100$ nm.

The excited guided-wave modes of slab 130 couple to the apertures/guided wave fibers with an efficiency proportional to the square of the amplitude of the excited modes of slab 130 and a portion of the excited guided wave modes in fiber 150 are radiated from the fiber at the interface with dielectric cladding 132. The radiated portion into dielectric cladding 132 will generally comprise a large numerical aperture which is matched to the properties of microscope imaging system 10. The numerical aperture of the radiated beam will be of the order of $\lambda_0/n_2 a$. The amplitude of the radiated beam can be increased with the addition of an AR coating at the interface of fiber 150 and dielectric cladding 132.

The relative phase of contiguous beams transmitted by the array of guided wave fibers 150 may be adjusted to a predetermined value by the selection of spacing b of array of guided wave fibers 150 and of angle $\theta_m$ of corresponding excited guided wave mode of thin-slab guided wave structure 112.

Figure 3:
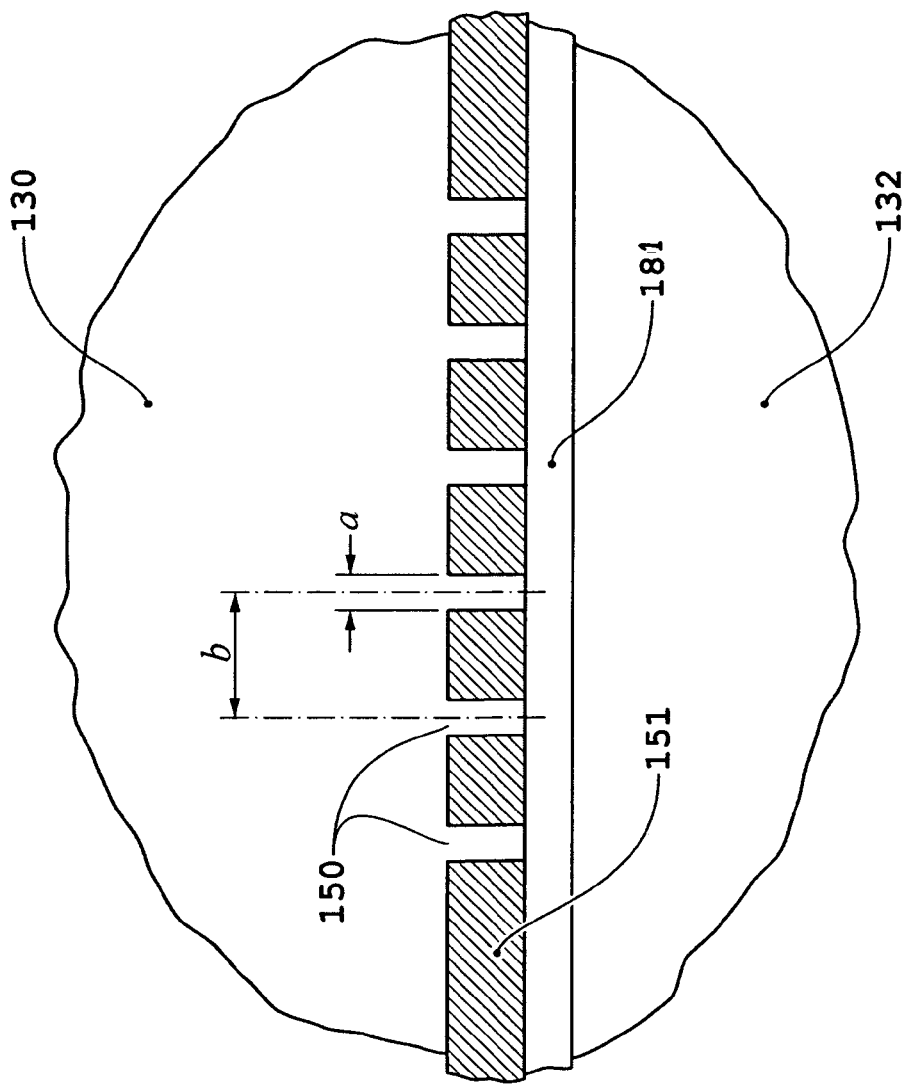
FIG. 3 is a schematic diagram of an array of apertures/guided wave fibers with a low index of refraction layer for compensation of optical aberrations.

A second embodiment comprises a thin-slab guided-wave structure of the first embodiment and a low index of refraction layer to compensate for aberrations generated in a microscopy imaging system 10 when there is a mismatch between indices of refraction at a substrate-medium interface. The second embodiment is shown in FIG. 3 with a compensating layer 181 of low refractive index. Elements of the second embodiment that are the same as elements of the first embodiment are shown in FIG. 3 with the same element numbers. The description of the second embodiment is the same as corresponding portions of the description given for the first embodiment and as corresponding portions of the descriptions given in commonly owned U.S. Provisional Patent Application No. 60/444,707 (ZI-44) entitled "Compensation for Effects of Mismatch in Indices of Refraction at a Substrate-Medium Interface in Confocal and Interferometric Confocal Microscopy" and U.S. patent application Ser.

No. 10/771,785, filed Feb. 4, 2004 (ZI-44) and also entitled "Compensation for Effects of Mismatch in Indices of Refraction at a Substrate-Medium Interface in Confocal and Interferometric Confocal Microscopy" both of which are by Henry A. Hill. The contents of the two cited patent applications are herein incorporated in their entirety by reference.

Microscopy imaging system 10 may comprise interferometric confocal microscopes that comprise a pinhole-array beam-splitter such as described in cited U.S. Provisional Application No. 60/442,982 (ZI-45) and U.S. Patent Application entitled "Interferometric Confocal Microscopy Incorporating Pinhole Array Beam-Splitter." The thin-slab guided-wave structure of the first or second embodiments is used as the pinhole-array beam-splitter of the cited U.S. Provisional Patent Application and U.S. Patent Application.

Microscopy imaging system 10 may comprise an interferometric far-field confocal microscope such as described in U.S. Pat. No. 5,760,901 entitled "Method And Apparatus For Confocal Interference Microscopy With Background Amplitude Reduction and Compensation" by Henry A. Hill, the contents of which are herein incorporated in their entirety by reference, and in cited U.S. Provisional Application No. 60/444,707 (ZI-44) and U.S. Patent Application entitled "Compensation for Effects of Mismatch in Indices of Refraction at a Substrate-Medium Interface in Confocal and Interferometric Confocal Microscopy." The thin-slab guided-wave structure of the first or second embodiments is used as the source or sources of the measurement and/or reference beams of microscopy imaging system 10.

Microscopy imaging system 10 may also comprise an interferometric far-field confocal microscope such as described in cited U.S. Pat. No. 5,760,901 entitled "Method And Apparatus For Confocal Interference Microscopy With Background Amplitude Reduction and Compensation" with the phase masks removed and in cited U.S. Provisional Application No. 60/444,707 (ZI-44) and U.S. Patent Application entitled "Compensation for Effects of Mismatch in Indices of Refraction at a Substrate-Medium Interface in Confocal and Interferometric Confocal Microscopy." The thin-slab guided-wave structure of the first or second embodiments is used as the source or sources of the measurement and/or reference beams of microscopy imaging system 10.

Microscopy imaging system 10 may also comprise an interferometric far-field confocal microscope such as described in U.S. Pat. No. 09/526,847 entitled "Multiple Layer Confocal Interference Microscopy Using Wavenumber Domain Reflectometry And Background Amplitude Reduction And Compensation" by Henry A. Hill, the contents of which are herein incorporated in their entirety by reference and in cited U.S. Provisional Application No. 60/444,707 (ZI-44) and U.S. Patent Application entitled "Compensation for Effects of Mismatch in Indices of Refraction at a Substrate-Medium Interface in Confocal and Interferometric Confocal Microscopy." The thin-slab guided wave structure of the first or second embodiments is used as the source or sources of the measurement and/or reference beams of microscopy imaging system 10.

Microscopy imaging system 10 may also comprise an interferometric far-field confocal microscope such as described in cited U.S. Pat. No. 09/526,847 entitled "Multiple Layer Confocal Interference Microscopy Using Wavenumber Domain Reflectometry And Background Amplitude Reduction And Compensation" with the phase masks removed, and in cited U.S. Provisional Application No. 60/444,707 (ZI-44) and U.S. Patent Application entitled "Compensation for Effects of Mismatch in Indices of Refraction at a Substrate-Medium Interface in Confocal and Interferometric Confocal Microscopy." The thin-slab guided wave structure of the first or second embodiments is used as the source or sources of the measurement and/or reference beams of microscopy imaging system 10.

Microscopy imaging system 10 may also comprise an interferometric near-field confocal microscope such as described in U.S. Pat. No. 6,445,453 entitled "Scanning Interferometric Near-Field Confocal Microscopy" by Henry A. Hill, the contents of which are herein incorporated in their entirety by reference, and in cited U.S. Provisional Application No. 60/444,707 (ZI-44) and U.S. Patent Application entitled "Compensation for Effects of Mismatch in Indices of Refraction at a Substrate-Medium Interface in Confocal and Interferometric Confocal Microscopy." The thin-slab guided wave structure of the first or second embodiments is used as the source or sources of the measurement and/or reference beams of microscopy imaging system 10.

What is claimed is:

1. A multiple source array comprising:
a guided-wave structure in which one or more guided-wave modes are excited during operation, said guided-wave structure including a dielectric core and a cladding covering and defining a boundary of the dielectric core; and
an array of dielectric-filled, guided-wave cavities in the cladding beginning at said boundary and extending transversely from the dielectric core and forming an array of apertures through which optical energy that is introduced into the core exits from the core, each cavity of the array of cavities having one or more transmission modes that during operation couple to the one or more guided-wave modes of the guided-wave structure thereby causing said optical energy to exit from the core through each aperture of the array of apertures, wherein the array of dielectric-filled cavities is a two dimensional array.

2. The multiple source array of claim 1 wherein the dielectric core is a planar dielectric core, wherein the cladding includes a first dielectric cladding layer covering a first side of the dielectric core, and a second dielectric cladding layer covering a second side of the dielectric core that is opposite from the first side, and wherein the array of dielectric-filled, guided-wave cavities extends transversely from the dielectric core into the first dielectric cladding.

3. The multiple source array of claim 2 wherein the guided wave structure in response to receiving a source beam characterized by a wavelength $\lambda_0$ generates excited-wave modes and wherein the first and second cladding layers each have a thickness such that leakage through the first and second cladding layers represent a negligible loss to the guided-wave modes.

4. The multiple source array of claim 2 wherein the guided wave structure in response to receiving a source beam characterized by a wavelength $\lambda_0$ generates excited-wave modes characterized by an extinction coefficient for each of the first and second dielectric cladding layers and wherein the first and second dielectric cladding layers each have a thickness such that the thickness of the respective cladding layer times the extinction coefficient is on the order of 10 or more.

5. The multiple source array of claim 2 wherein the index of refraction of the core is greater than the index of refraction of the first and second cladding layers.

6. The multiple source array of claim 5 wherein the index of refraction of the dielectric that fills the cavities is greater than the index of refraction of the first cladding layer.

7. The multiple source array of claim 6 wherein the dielectric of the core is the same as the dielectric filling the cavities.

8. The multiple source array of claim 2 wherein the cavities have a rectangular cross-section in a plane that is parallel to the planar dielectric core.

9. The multiple source array of claim 2 wherein the guided wave structure is designed to operate at a wavelength $\lambda_0$ and wherein the cavities have a width that is on the order of $\lambda_0/2n_f$ wherein $n_f$ is the index of refraction of the dielectric in the cavity.

10. The multiple source array of claim 1 wherein the cavities have a width selected so that there exist transmission modes of the guided wave cavities that couple to excited wave modes of the guided wave structure.

11. The multiple source array of claim 1 wherein the guided-wave structure is designed to operate at a selected wavelength $\lambda_0$ and wherein the cavities have apertures that are sub-wavelength in size.

12. The multiple source array of claim 2 further comprising a source that during operation generates and delivers an optical beam to the dielectric core.

13. The multiple source array of claim 12 wherein the guided-wave structure during operation confines the delivered optical beam by total internal reflection and produces excited guided-wave modes.

14. The multiple source array of claim 1 wherein the dielectric core is made of a material that transmits in the UV.

15. The multiple source array of claim 2 further comprising a compensating layer of low index of refraction dielectric positioned so that light emanating from the array of cavities passes through the compensating layer.

16. The multiple source array of claim 15 wherein the cavities of the array of cavities terminate at the compensating layer.

17. The multiple source array of claim 2 wherein the dielectric core is made of a material selected from the group consisting of lithium fluoride, calcium fluoride, fused silica, magnesium aluminum spinel, aluminum oxynitride spinel, YAG, tantalum pentaoxide, and cubic carbon.

18. The multiple source array of claim 1 wherein during operation the guided-wave modes are excited within and propagate along the dielectric core.

19. A multiple source array comprising:
a guided-wave structure in which one or more guided-wave modes are excited during operation, said guided-wave structure including a dielectric core and a cladding covering and defining a boundary of the dielectric core;
an array of dielectric-filled, guided-wave cavities in the cladding beginning at said boundary and extending transversely from the dielectric core and forming an array of apertures through which optical energy that is introduced into the core exits from the core, each cavity of the array of cavities having one or more transmission modes that during operation couple to the one or more guided-wave modes of the guided-wave structure thereby causing said optical energy to exit from the core through each aperture of the array of apertures; and
a prism coupler located against the first side of the dielectric core for coupling an optical input beam into the dielectric core.

20. The multiple source array of claim 19 wherein the prism coupler includes a prism having an output facet and includes a dielectric layer that is sandwiched between the output facet and the dielectric core, wherein the dielectric layer has an index of refraction that is different from the index of refraction of the dielectric prism.

21. The multiple source array of claim 20 wherein the prism has an index of refraction ($n_p$) and the dielectric layer has an index of refraction ($n_s$) and wherein $n_s < n_p$.

22. The multiple source array of claim 19 wherein the dielectric layer is of uniform thickness and the output facet of the prism is parallel to the first side of the dielectric core.

23. The multiple source array of claim 19 wherein the dielectric layer is tapered and the output facet of the prism is in a non-parallel relationship with the first side of the dielectric core.

24. The multiple source array of claim 19 further comprising a first mirror element defining a mirrored first surface through which the optical input beam passes on its way to the prism and a second mirror element defining a second mirror surface which with the first mirror surface forms a Transversely Coupled Fabry-Perot Resonator (TCFPR) having a cavity that includes the prism.

25. The multiple source array of claim 24 further comprising an element for modulating resonant properties of the TCFPR.

26. The multiple source array of claim 25 wherein the element for modulating resonant properties of the TCFPR is selected from the group consisting of an electro-mechanical transducer, an electro-optical phase modulator, and a device that operates by using thermal expansion.

27. A multiple source array comprising:
a guided-wave structure in which one or more guided-wave modes are excited during operation, said guided-wave structure including a planar dielectric core, a first dielectric cladding layer covering and defining a boundary of a first side of the dielectric core, and a second dielectric cladding layer covering a second side of the dielectric core that is opposite from the first side; and
an array of dielectric-filled, guided-wave cavities in the first dielectric cladding beginning at said boundary and extending transversely from the dielectric core into the first dielectric cladding and forming an array of apertures through which optical energy that is introduced into the core exits from the core, each cavity of the array of cavities having one or more transmission modes that during operation couple to the one or more guided-wave modes of the guided-wave structure thereby causing said optical energy to exit from the core through each aperture of the array of apertures, wherein the array of dielectric-filled cavities is a two dimensional array.

28. The multiple source array of claim 27 wherein during operation the guided-wave modes are excited within and propagate along the dielectric core.

29. A system comprising:
an optical measurement instrument; and
a multiple source array which during operation provides an array of optical beams as input to the optical instrument, wherein the multiple source array comprises:
a guided-wave structure including a planar dielectric core, a first dielectric cladding layer covering a first side of the dielectric core, and a second dielectric cladding layer covering a second side of the dielectric core that is opposite from the first side;
an array of dielectric-filled, guided-wave cavities in the first dielectric cladding extending transversely from the dielectric core into the first dielectric cladding and forming an array of apertures through which optical energy that is introduced into the core exits from the core; and a source that during operation generates and delivers an optical beam to the dielectric core.

30. The system of claim 29 wherein the optical instrument is a microscope.

31. The system of claim 30 wherein the microscope is a confocal microscope.

32. The system of claim 29 wherein the optical instrument is an interferometric microscope.

33. The system of claim 32 wherein the interferometric microscope is an interferometric confocal microscope.

34. The system of claim 33 wherein the interferometric microscope is an interferometric far-field confocal microscope.

35. The system of claim 33 wherein the interferometric microscope is an interferometric near-field confocal microscope.

36. The system of claim 29 wherein the guided-wave structure functions as an aperture array beam-splitter for beams incident on the array of apertures in a direction opposite to the direction that the optical energy exits from the core.

* * * * *